(12) United States Patent
Blankenship et al.

(10) Patent No.: US 10,440,710 B2
(45) Date of Patent: Oct. 8, 2019

(54) RESOURCE STRUCTURE AND INDICATION FOR REL-13 MTC UE

(71) Applicant: TELEFONAKTIEBOLAGET L M ERICSSON (PUBL), Stockholm (SE)

(72) Inventors: Yufei Blankenship, Kildeer, IL (US); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/506,289

(22) Filed: Oct. 3, 2014

(65) Prior Publication Data

US 2016/0072614 A1    Mar. 10, 2016

Related U.S. Application Data

(60) Provisional application No. 62/047,756, filed on Sep. 9, 2014.

(51) Int. Cl.
*H04L 5/00* (2006.01)
*H04W 4/70* (2018.01)
(Continued)

(52) U.S. Cl.
CPC ....... *H04W 72/0453* (2013.01); *H04L 5/0044* (2013.01); *H04L 5/0046* (2013.01);
(Continued)

(58) Field of Classification Search
CPC ............ H04L 5/003–0098; H04W 4/005–006; H04W 72/04–10; H04W 4/70
See application file for complete search history.

(56) References Cited

U.S. PATENT DOCUMENTS

| 2013/0114393 A1* | 5/2013 | Lee ........................ H04L 5/0048 370/210 |
| 2013/0114533 A1 | 5/2013 | Ji et al. |

(Continued)

FOREIGN PATENT DOCUMENTS

| WO | 2013/049768 A1 | 4/2013 |
| WO | 2013/077235 A1 | 5/2013 |
| WO | 2014/049325 A1 | 4/2014 |

OTHER PUBLICATIONS

Huawei et al: "Recommendation for bandwidth reduction", 3GPP Draft; R1-121708, vol. RAN WG1, No. 68bis, Mar. 23, 2012 (Mar. 23, 2012), XP050600066, Jeju, Korea [retrieved on Mar. 23, 2012].
(Continued)

*Primary Examiner* — Timothy J Weidner

(57) ABSTRACT

Embodiments described herein are directed methods and network nodes for operating a wireless device in a wireless network. The network node is configured to determine a subchannel within a system bandwidth of the wireless network. The subchannel is an off-center subchannel with respect to the system bandwidth, and the subchannel includes a plurality of consecutive subcarriers taken from one or more contiguous physical resource blocks. The network node can further map the subchannel's center frequency to a subcarrier of a physical resource block included in the subchannel, wherein the center frequency corresponds to a direct current subcarrier at a receiver associated with the wireless device. The network node can allocate the subchannel to the wireless device.

14 Claims, 11 Drawing Sheets

(51) Int. Cl.
*H04W 72/04* (2009.01)
*H04W 72/10* (2009.01)

(52) U.S. Cl.
CPC .......... *H04L 5/0076* (2013.01); *H04L 5/0094* (2013.01); *H04W 4/70* (2018.02); *H04W 72/048* (2013.01); *H04W 72/0446* (2013.01); *H04W 72/10* (2013.01)

(56) References Cited

U.S. PATENT DOCUMENTS

| | | | |
|---|---|---|---|
| 2015/0200758 A1* | 7/2015 | Wakabayashi | H04L 5/0041 370/329 |
| 2015/0381330 A1* | 12/2015 | Chen | H04L 5/0046 370/329 |

OTHER PUBLICATIONS

Mediatek Inc: "Narrow band LTE for MTC in LTE Rel-13", 3GPP Draft; R1-142919, vol. RAN WG1, Aug. 17, 2014 (Aug. 17, 2014), XP050788402, Dresden, Germany [retrieved on Aug. 17, 2014: URL:http://www.3gpp.org/ftp/Meetings_3GPP _SYNC/RAN1/Docs/].

* cited by examiner

RESOURCE STRUCTURE AND INDICATION FOR REL-13 MTC UE

TECHNICAL FIELD

The present disclosure is directed to wireless communication in telecommunications networks and, more particularly, to wireless communication methods, networks, and network nodes for supporting a machine-type communication (MTC) user equipment (UE) in a Third Generation Partnership Project (3GPP) long-term evolution (LTE) system.

BACKGROUND

Machine-Type Communication (MTC) is a form of data communication which involves one or more entities that do not necessarily need human interaction. MTC is an important and growing revenue stream for wireless network operators. MTC devices, such as monitors, sensors, controls, etc., may also be referred to as MTC user equipment (UE). Operators benefit from serving MTC devices with already deployed radio access technology. For example, 3GPP LTE is a competitive radio access technology for efficient support of MTC.

Lower cost MTC devices facilitate and expedite implementation of the concept known as the "internet of things". In many applications, MTC devices may require low operational power consumption and may communicate with infrequent and short-duration burst transmissions. In addition, MTC devices deployed deep inside buildings may require coverage enhancement in comparison to a defined LTE cell coverage footprint.

3GPP LTE Rel-12 has defined an MTC UE power saving mode that facilitates longer battery life and a new MTC UE category that facilitates reduced modem complexity. Work in Rel-13 is expected to further reduce UE cost and provide coverage enhancement.

For operators to serve MTC devices within a deployed radio access network, such as an LTE network, the MTC devices share the uplink and downlink channels available in the network with traditional UEs such as smartphones, tablets, etc. In an LTE system the available uplink and downlink channels may be described in frequency domain by certain bandwidth and in the time domain by certain subframes. Portions of the available bandwidth and subframes may be allocated for transmission of control information, for user data, or both.

MTC devices may include optimizations to facilitate energy efficient operation and relatively low cost of manufacturing. MTC devices can also co-exist with traditional UEs in the existing framework of an operator's wireless network. To co-exist, MTC devices may share the uplink and downlink resources of the wireless network.

In 3GPP LTE Rel-13 MTC investigation, a key element to enable cost reduction is to introduce reduced UE RF bandwidth of 1.4 MHz, for example, in downlink and uplink within any system bandwidth.

Currently, the LTE specification does not allow a UE to transmit and receive with a reduced RF bandwidth. However Rel-13 MTC UE is only capable of transmitting and receiving with a reduced bandwidth, e.g., 1.4 MHz, in both RF and baseband.

SUMMARY

Embodiments described herein are directed to solving one or more problems with conventional systems, as described above, along with other features that will be become apparent to one of ordinary skill in the art in light of the written description and drawings.

Embodiments described herein are directed to a method of operating a wireless device in a wireless network. The method can comprise determining a subchannel within a system bandwidth of the wireless network. In certain embodiments, the subchannel is an off-center subchannel with respect to the system bandwidth, and the subchannel includes a plurality of consecutive subcarriers taken from one or more contiguous physical resource blocks (PRBs). The method can further include mapping the subchannel's center frequency to a subcarrier of a PRB included in the subchannel, wherein the center frequency corresponds to a direct current (DC) subcarrier at a receiver associated with the wireless device; and allocating, by a wireless network node, the subchannel to the wireless device.

Another embodiment described herein is directed to a wireless network node in a wireless network, configured to allocate resources for a wireless device with a reduced radio frequency bandwidth. The node can include a processing module configured to determine a subchannel within a system bandwidth of the wireless network. In certain embodiments, the subchannel is an off-center subchannel with respect to the system bandwidth, and the subchannel includes a plurality of consecutive subcarriers taken from one or more contiguous PRBs. The node can further include a mapping module configured to map the subchannel's center frequency to a subcarrier of a PRB included in the subchannel, wherein the center frequency corresponds to a DC subcarrier at a receiver associated with the wireless device, and an allocation module configured to allocate the subchannel to the wireless device.

Yet another embodiment is directed to a non-transitory computer-readable medium storing instructions thereon for, when executed by a processor, performing a method of allocating resources for a wireless device with a reduced radio frequency bandwidth. The method can include determining a subchannel within a system bandwidth of the wireless network. In certain embodiments, the subchannel is an off-center subchannel with respect to the system bandwidth, and the subchannel includes a plurality of consecutive subcarriers taken from one or more contiguous physical resource blocks (PRBs). The method can further include mapping the subchannel's center frequency to a subcarrier of a PRB included in the subchannel, wherein the center frequency corresponds to a direct current (DC) subcarrier at a receiver associated with the wireless device; and allocating, by a wireless network node, the subchannel to the wireless device.

Yet another embodiment described herein is directed to a UE with a reduced radio frequency RF bandwidth in a wireless network. The UE can include a receiving module configured to receive an allocated subchannel within a system bandwidth of the wireless network. According to certain embodiments, the subchannel is an off-center subchannel with respect to the system bandwidth, the subchannel includes a plurality of consecutive subcarriers taken from one or more contiguous PRBs, and the subchannel's center frequency is mapped to a subcarrier of a PRB included in the subchannel, wherein the center frequency corresponds to a DC subcarrier associated with the UE.

The methods described herein can further include scheduling a physical channel to one or more subcarriers of the subchannel, where the one or more subcarriers do not include the DC subcarrier.

The methods can further include scheduling a physical channel to one or more subcarriers of the subchannel, where the one or more subcarriers include the DC subcarrier; and performing rate matching on the physical channel bits to account for the DC subcarrier Other features and advantages will become obvious to one of ordinary skill in the art in light of the following detailed description and drawings.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches.

Certain embodiments described herein refer to multicarrier networks, however, the embodiments are not limited thereto. Some embodiments may also be applied to single carrier networks.

Two types of duplexing modes are supported in 3GPP LTE, i.e. Frequency Division Duplexing (FDD) and Time Division Duplexing (TDD). In FDD mode, all subframes are available for downlink transmission as different carrier frequencies are used for downlink and uplink. This is known as "Frame Structure Type 1". In TDD mode, only a subset of the subframes are available for downlink transmission as the same carrier frequency is used for both downlink and uplink; the remaining subframes are used for uplink transmission or for special subframes which allow for switching between downlink and uplink transmission. A guard time period is provided in the special subframes to accommodate round trip delays between eNB and a UE as well as the time for UE switching between Rx and Tx. This TDD subframe structure is known as "Frame Structure Type 2".

One derivative of FDD is half-duplex (HD-FDD) operation in which eNB operates in full duplex mode where a UE does not receive and transmit simultaneously. A HD-FDD UE can only receive on some subframes and transmit on other subframes. Unlike in the TDD case, here a UE receives on one frequency and transmit on a different frequency.

LTE uses orthogonal frequency division multiplexing (OFDM) in the downlink and DFT-spread OFDM in the uplink.

Figure 1A:
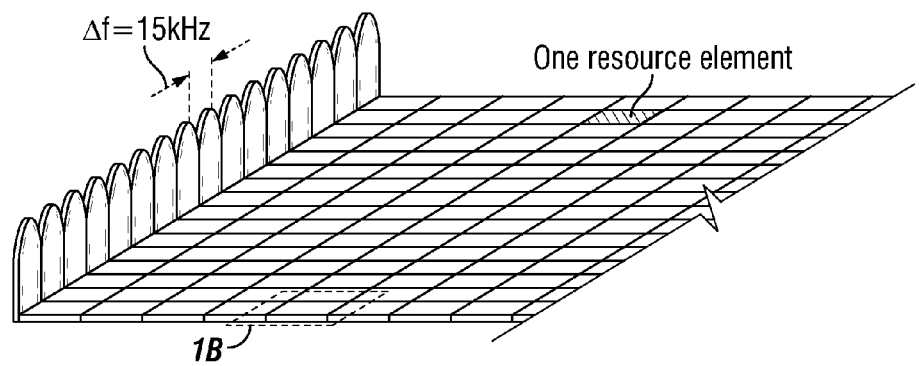
FIGS. 1(a) and (b) show an exemplary LTE downlink physical resource and one OFDM symbol including a cyclic prefix, according to an embodiment.
Figure 1B:
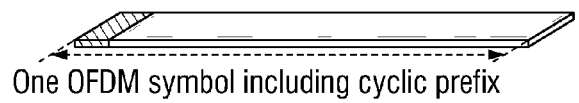

The basic LTE downlink physical resource can thus be seen as a time-frequency grid as illustrated in FIG. 1(a), where each resource element corresponds to one OFDM subcarrier during one OFDM symbol interval, which can include a cyclic prefix, as shown in FIG. 1(b).

Figure 2:
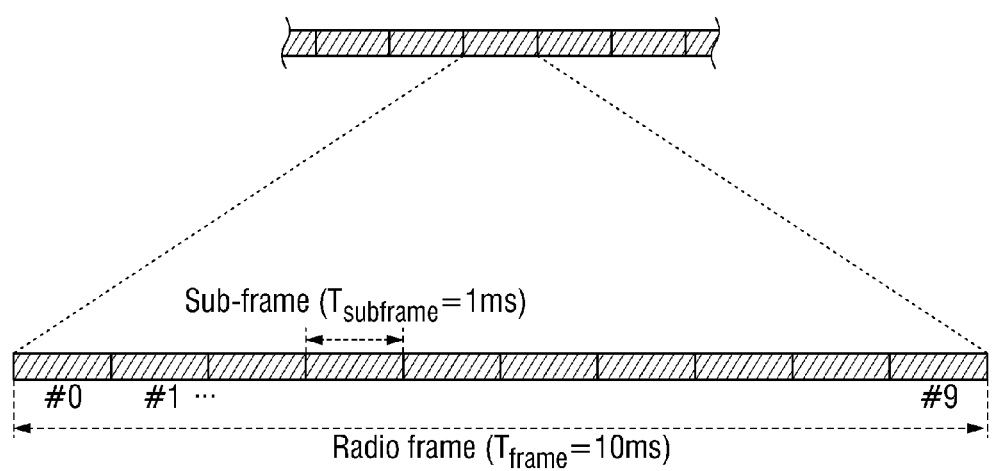
FIG. 2 is an exemplary LTE time-domain structure, according to an embodiment

As shown in FIG. 2, in the time domain, LTE downlink transmissions are organized into radio frames of 10 ms, each radio frame consisting of ten equally-sized subframes of length $T_{subframe}$=1 ms. Each subframe is further divided into two slots of 0.5 ms each.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Figure 3:
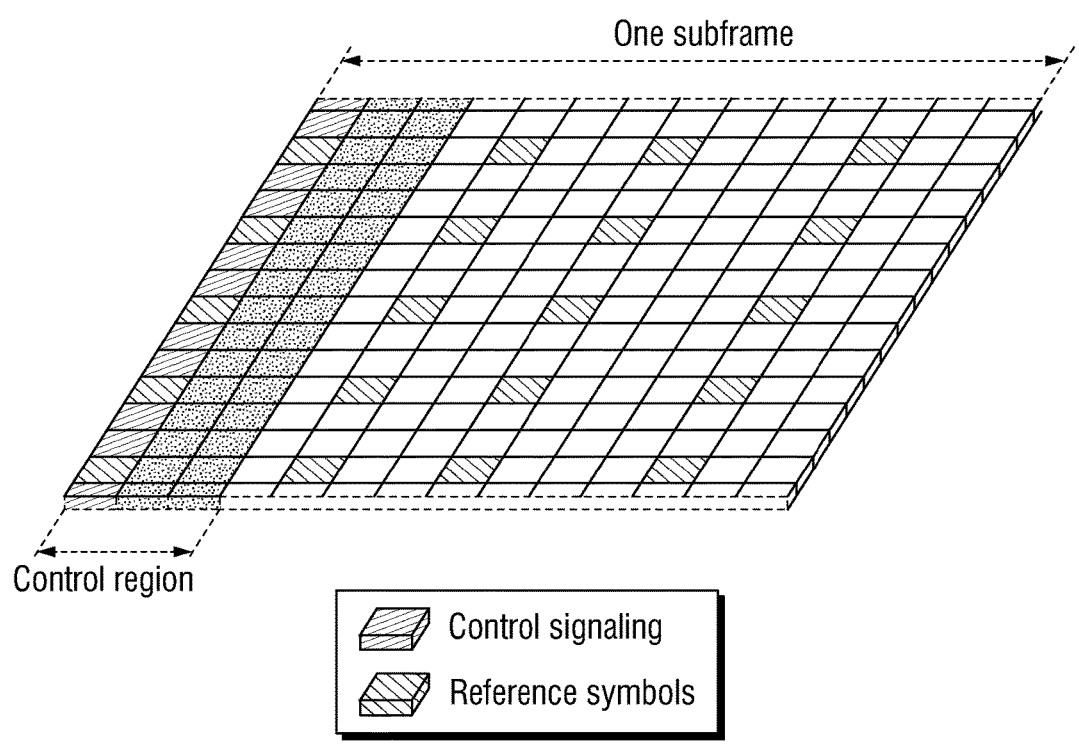
FIG. 3 is an exemplary downlink subframe, according to an embodiment.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, above-described resource assignments can also be scheduled on the enhanced Physical Downlink Control Channel (EPDCCH). For Rel-8 to Rel-10 only Physical Downlink Control Channel (PDCCH) is available.

Figure 4:
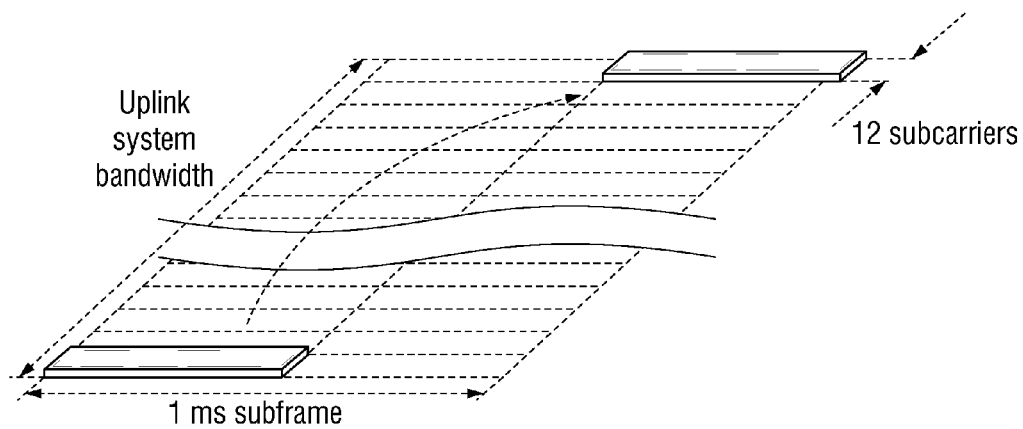
FIG. 4 is an exemplary uplink L1/L2 control signaling transmission on Rel-8 PUCCH, according to an embodiment.

If the mobile terminal has not been assigned an uplink resource for data transmission, the layer 1 and layer 2 (L1/L2) control information (channel-status reports, hybrid-ARQ acknowledgments, and scheduling requests) is transmitted in uplink resources (resource blocks) specifically assigned for uplink L1/L2 control on Rel-8 PUCCH. As illustrated in FIG. 4, these resources are located at the edges of the total available system bandwidth. Each such resource consists of 12 "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

Figure 5:
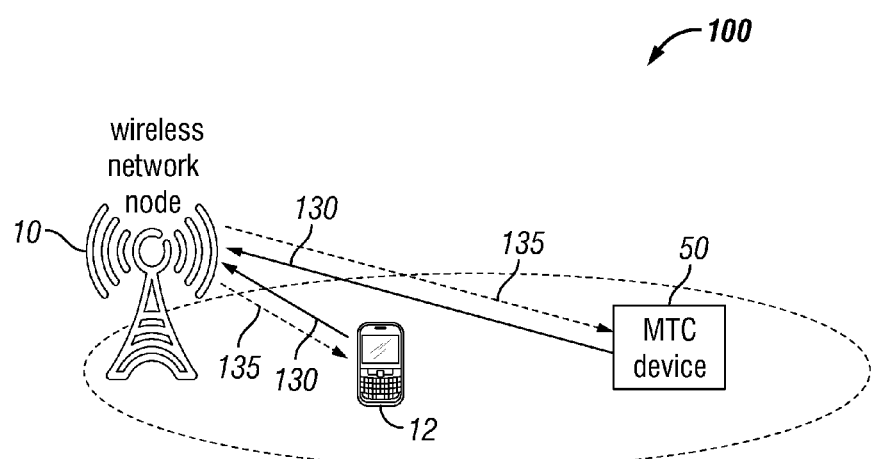
FIG. 5 is an exemplary wireless network, according to various embodiments.

FIG. 5 is a block diagram illustrating an example of a network 100, according to a particular embodiment. Network 100 includes wireless network node 10 (such as a base station or eNodeB), MTC device 50 (such as a control, sensor, monitor, appliance, etc.), and a non-MTC wireless device 12 (such as a mobile phone, smart phone, laptop computer, tablet computer, or another device that can provide wireless communication and user interaction). The MTC device 50 can be a special type of wireless device (also called 'UE' in 3GPP LTE) being served by the wireless network node 10. The MTC device 50 may be designed to have reduced bandwidth access and lower complexity, etc., as compared to a non-MTC 12 device which has full bandwidth access and higher complexity. In general, MTC devices 50 and non-MTC devices 12 that are within coverage of wireless network node 10 communicate with wireless network node 10 by transmitting and receiving wireless signals 130. For example, wireless devices 12 (or 50) and wireless network node 10 may communicate wireless signals 130 containing voice traffic, data traffic, and/or control signals. Wireless signals 130 may include both downlink transmissions (from wireless network node 10 to MTC device 50 or non-MTC device 12) and uplink transmissions (from MTC device 50 or non-MTC device 12 to wireless network node 10).

In network 100, each wireless network node 10 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As referred to herein, a user equipment (UE) (e.g., an end station, a network device, a wireless terminal, a wireless device, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

Figure 6:
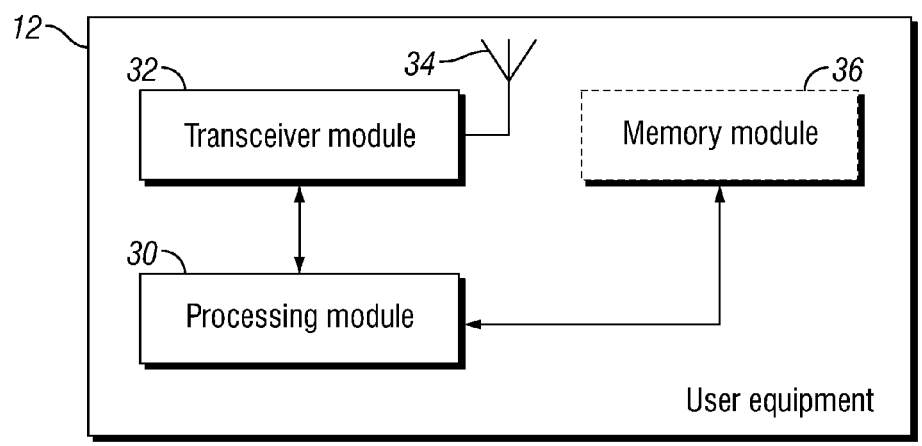
FIG. 6 is an exemplary block diagram of a UE and/or MTC device configuration, according to various embodiments.

FIG. 6 is a block diagram of an exemplary MTC device 50, according to exemplary embodiments. Accordingly to an embodiment, the MTC device 50 may in some embodiments be a mobile device that is configured for machine-to-machine (M2M) and/or MTC. The MTC device 50 in general (it is noted that in 3GPP LTE MTC device 50 can be considered a specific type of UE) comprises a processing module 30 that controls the operation thereof. The processing module 30 is connected to a receiver or transceiver module 32 with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. The MTC device 50 can also each include a memory module 36 that is connected to the processing module 30 and that stores program and other information and data required for the operation thereof. As referred to herein, MTC device 50 can be referred to as "MTC UE" or a "UE." The non-MTC wireless device 12 can also be referred to as a "UE".

Figure 7:
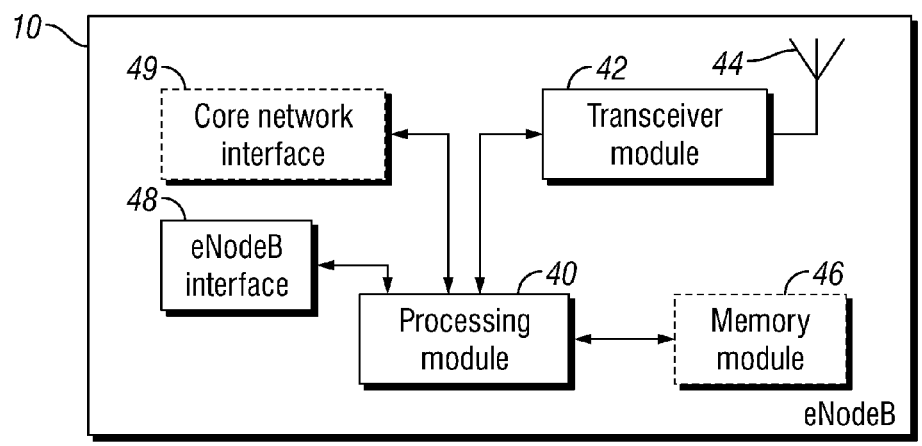
FIG. 7 is an exemplary block diagram of a base station configuration, according to various embodiments.

FIG. 7 shows a block diagram of wireless network node 10 (for example a NodeB or an eNodeB ("eNB")), also referred to herein as a "base station 10," that can be used in example embodiments described. It will be appreciated that although a macro eNB will not in practice be identical in size and structure to a micro eNB, for the purposes of illustration, the base stations 10 are assumed to include similar components. Thus, the wireless radio work node 10 comprises a processing module 40 that controls the operation of the wireless radio work node 10. The processing module 40 is connected to a transceiver module 42 with associated antenna(s) 44 which are used to transmit signals to, and receive signals from, UEs 12 and MTC devices 50 in the network. The wireless radio work node 10 also comprises a memory module 46 that is connected to the processing module 40 and that stores program and other information and data required for the operation of the base station 10. The wireless radio work node 10 also includes components and/or circuitry 48 for allowing the wireless radio work node 10 to exchange information with other wireless radio work nodes 10 (for example via an X2 interface) and components and/or circuitry 49 for allowing the wireless radio work node 10 to exchange information with nodes in the core network. It will be appreciated that base stations for use in other types of network (e.g. UTRAN or WCDMA RAN) will include similar components to those shown in FIG. 7 and appropriate interface circuitry 48, 49 for enabling communications with the other network nodes in those types of networks (e.g. other base stations, mobility management nodes and/or nodes in the core network).

Embodiments described herein provide methods, stations and systems for enabling resource allocation for Rel-13 MTC UE 50 with a reduced RF bandwidth, with respect to the network bandwidth. In this disclosure, the Rel-13 MTC UE 50 is assumed to transmit and receive with a reduced RF bandwidth of 1.4 MHz within any system bandwidth greater than or equal to 1.4 MHz. Along with various other features, the disclosure proposes the following:

For downlink: Subchannel definition for both central subchannel and off-center subchannels; Methods of mapping a subcarrier to the DC of a MTC receiver for off-center subchannels; Method of mapping the center frequency of off-center subchannels to a frequency in-between two subcarriers to avoid colliding a subcarrier with the DC in a MTC receiver; and Definition of subchannel to satisfy the 100 kHz raster.

For uplink: Subchannel definition and resource allocation to avoid conflict with existing PUCCH resources; and UL subchannel definition as related to DL subchannel definition in FDD and TDD system.

The proposed methods and systems provide the physical layer resource structure to enable downlink and uplink operation of a Rel-13 MTC UE 50, according to exemplary embodiments. The methods allow co-existence of MTC UE 50 with non-MTC UEs 12 in a cell that may use any LTE system bandwidth, for example.

In various embodiments, "MTC UE 50" refers to a LTE Rel-13 MTC UE 50 which operates with a reduced RF bandwidth of 1.4 MHz, for example, in both uplink and downlink. The 1.4 MHz can reside within any wider system bandwidth that the eNB 10 is using for the cell. It is noted that 1.4 MHz is used herein as a reduced bandwidth, with respect to an overall system bandwidth; however, various other reduced bandwidths may be similarly employed.

DL Resource Allocation for Rel-13 MTC UEs 50

Figure 8:
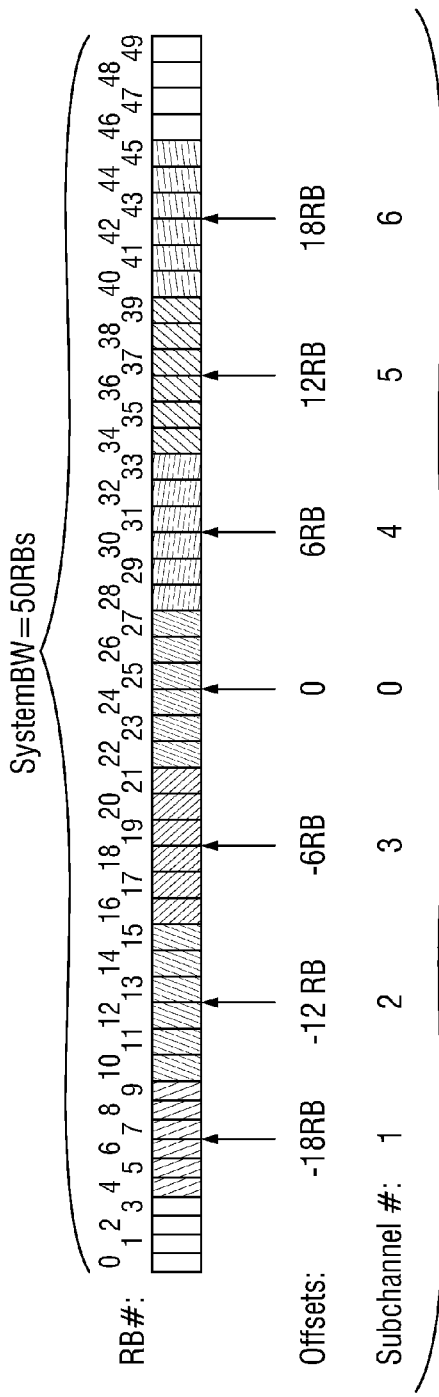
FIG. 8 is an exemplary MTC subchannel mapping in a 10 MHz system, according to an embodiment.
Figure 9:
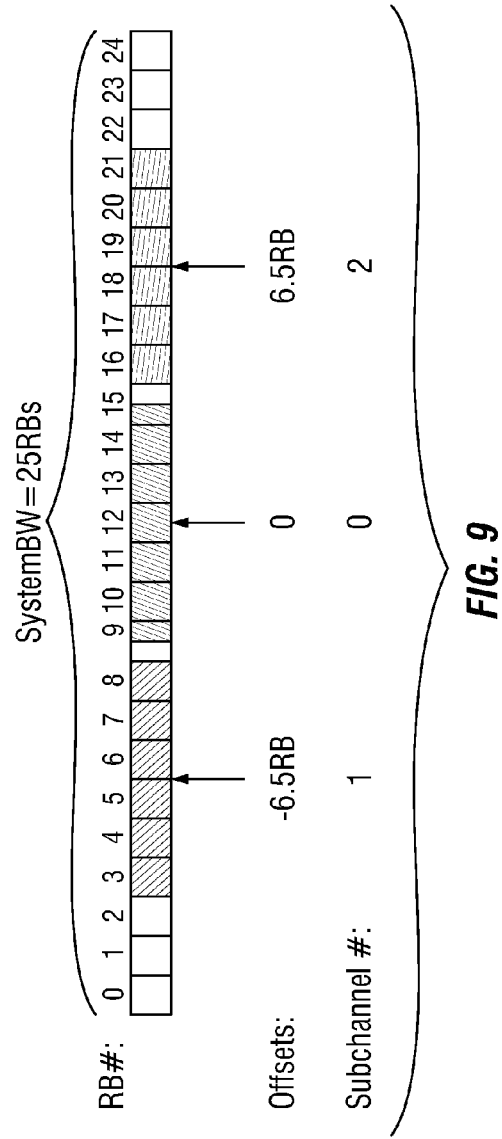
FIG. 9 is an exemplary MTC subchannel mapping in a 5 MHz system, according to an embodiment.

The DL system bandwidth may be divided into a number of DL MTC subchannels, each can be used for serving a MTC UE 50 with 1.4 MHz Rx bandwidth. Each DL subchannel can be defined by a frequency offset from the center of the system bandwidth (i.e. the carrier frequency). FIGS. 8 and 9 are two examples of mapping MTC subchannels in a 10 MHz and 5 MHz systems, respectively. Subchannel 0 is centered at the system bandwidth, and is needed for PSS/SSS/PBCH acquisitions and adjacent cell measurements. Other subchannels are off-center subchannels, and can be defined to provide additional system capacity for MTC UEs 50 as well as frequency diversity if a MTC UE 50 is configured to use different subchannels at different times.

Central Subchannel

Let a subchannel be any of the 1.4 MHz reduced bandwidth (BW) on which the Rel-13 MTC UE 50 can operate. Let subchannel 0 be the 1.4 MHz-wide subchannel that is centered at the central carrier frequency of the system BW. Note the indexing of the subchannels used here is for illustration only, and one of skill in the art would realize that there are other equivalent ways to define the indices of the subchannels.

As illustrated in FIGS. 8 and 9, the central subchannel, subchannel 0, always covers the central 72 subcarriers, so that the MTC UE 50 can receive PSS/SSS/PBCH from the eNB. The central 72 subcarrier may or may not constitute 6 PRBs. Specifically, for system bandwidths of 3 MHz, 5 MHz, 15 MHz, Subchannel 0 includes two halves of PRB at the higher and lower end of the 1.4 MHz. As a result, for system bandwidths of 3 MHz, 5 MHz, 15 MHz, the maximum number of whole PRBs in Subchannel 0 that can be allocated to the MTC UE is 5 PRBs. Note that the two halves PRBs do not need to be left vacant, since the eNB can use those PRBs towards other UEs which include: (a) UEs 12 that are not MTC UE 50; (b) MTC UE 50 that operate on subchannels other than Subchannel 0; (c) MTC UEs 50 that are capable of receiving fractional PRB(s). This is shown in for the defined LTE system bandwidths.

TABLE 1

PRBs occupied by Subchannel 0

| System BW (MHz) | $N_{RB}^{DL}$ | Indices of PRBs occupied by Subchannel 0 | Whole PRBs allocable to MTC UE 50 |
|---|---|---|---|
| 1.4 | 6 | #0-#5 | #0-#5 (6 PRBs) |
| 3 | 15 | Half of PRB #4, #5-#9, half of PRB #10 | #5-#9 (5 PRBs) |
| 5 | 25 | Half of PRB #9, #10-#14, half of PRB #15 | #10-#14 (5 PRBs) |
| 10 | 50 | #22-#27 | #22-#27 (6 PRBs) |
| 15 | 75 | Half of PRB #34, #35-#39, half of PRB #40 | #35-#39 (5 PRBs) |
| 20 | 100 | #47-#52 | #47-#52 (6 PRBs) |

Off-Center Subchannels

While Subchannel 0 has to be aligned in the central 72 subcarrier of the system bandwidth, the definition of MTC subchannels other than subchannel 0 can be flexible.

One option is to define non-overlapping consecutive subchannels. This is illustrated in FIG. 8 for system bandwidth of 10 MHz, and in FIG. 9 for system bandwidth of 5 MHz. Note that for the 5 MHz system, since PRB #9 and #15 cannot be allocated to MTC UE of subchannel 0, PRB #9 and #15 can be defined to be part of subchannel 1 and 2, respectively. Since most system bandwidths do not have $N_{RB}^{DL}$ that is a multiple of 6 (PRB), defining consecutive non-overlapping subchannels will make it impossible to allocate some PRBs to the MTC UE 50, such as the PRBs at the highest and lowest ends of the BW in FIGS. 8 and 9.

Figure 10:
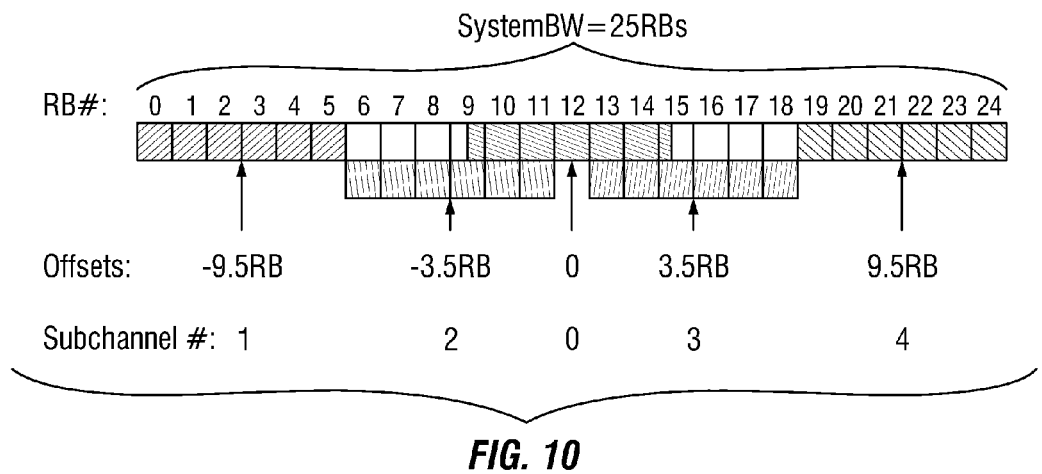
FIG. 10 is an alternative example of MTC subchannel mapping in a 5 MHz system, according to an embodiment.

Another option is to define subchannels that are not consecutive, i.e. they can overlap in RBs. An example of such definition of MTC subchannels in a 5 MHz system is shown in FIG. 10, where subchannel #0 overlaps with subchannels #2 and #3. Defining overlapping Subchannels has the advantage of a larger number of total subchannels, thus allowing more flexibility in DL PRB allocation. Since most system bandwidths do not have $N_{RB}^{DL}$ that is a multiple of 6 (PRB), defining non-consecutive and/or overlapping subchannels makes it possible to assign any PRB in the system to a MTC UE 50.

DL Shifted "DC" Subcarrier

When the MTC UE 50 with direct down conversion receiver receive a DL subchannel that is not centered at the system BW, one of the subcarriers in the subchannel can end up in the Direct Current (DC) in the received BW of the MTC UE 50, which is referred here as the shifted "DC" subcarrier. Since large DC signals can also be generated by other receiver imperfections such as local oscillator (LO) leakage, it is difficult to decode any information carried on the shifted DC subcarrier. A subchannel is an off-center subchannel with respect to the system bandwidth if the subchannel is not centered at the system BW, and the DC subcarrier of the subchannel does not coincide with the DC subcarrier of the system bandwidth.

i. Position of Shifted DC Subcarrier within a PRB

Figure 11:
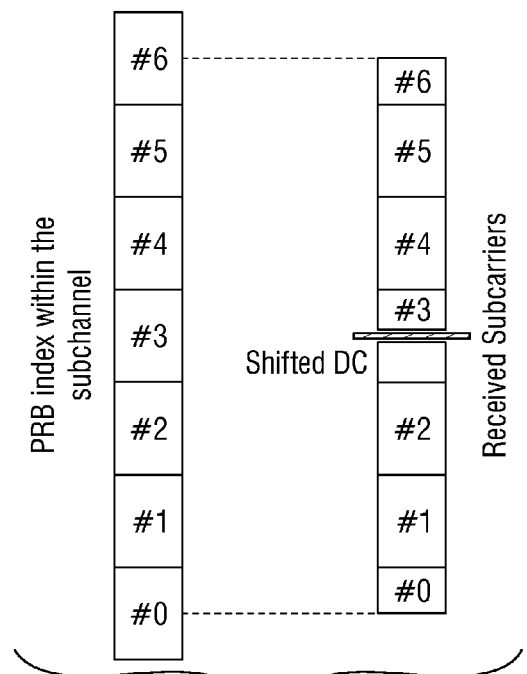
FIG. 11 is an example where only 5 full physical resource blocks (PRBs) are receivable if the shifted DC is located in the middle of a PRB, according to an embodiment.

If the shifted DC is located in the middle of a PRB, then only 5 whole PRBs are allocable to the MTC UE 50. This is illustrated with an example in FIG. 11, where PRB #0 and #6 are not usable as whole PRBs towards the MTC UE 50. Thus it is preferable that the shifted DC is located at the lowest or highest subcarrier of a PRB, which allows the MTC to be able to receive full 6 PRBs. The option with the shifted DC located at the lowest subcarrier of a PRB is illustrated in FIGS. 12(a) and (b) (configuration A), while the option with the shifted DC located at the highest subcarrier of a PRB is illustrated in FIGS. 13(a) and (b) (configuration B).

ii. Configuration of Shifted "DC" Subcarrier

Figure 12A:
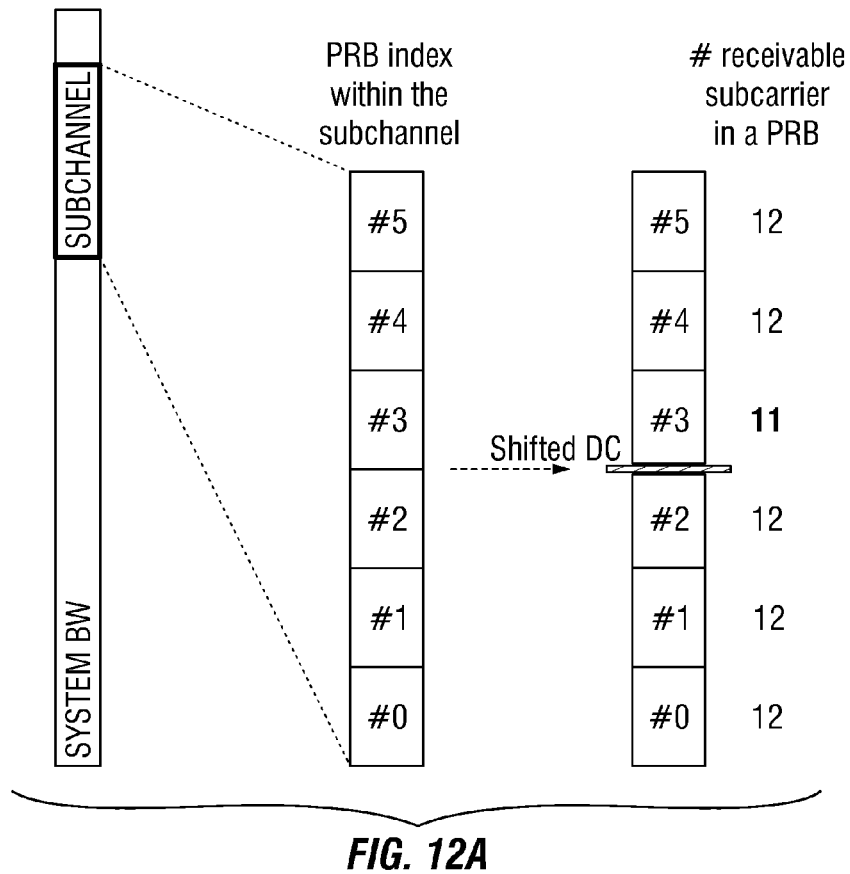
FIGS. 12(a) and (b) show an exemplary configuration with a shifted direct current (DC) subcarrier in the non-centered subchannel, according to an embodiment.
Figure 12B:
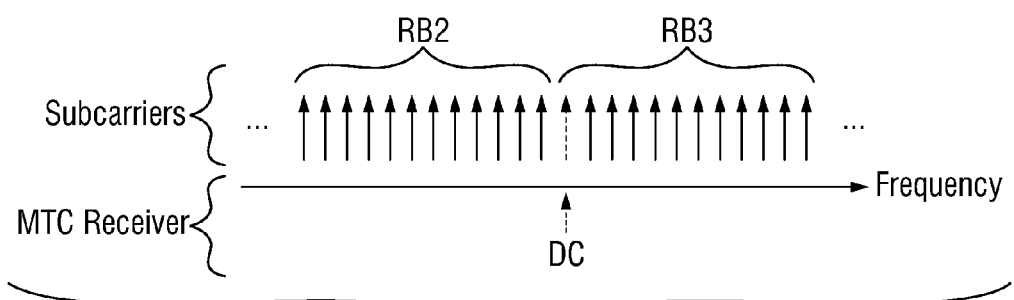
Figure 13A:
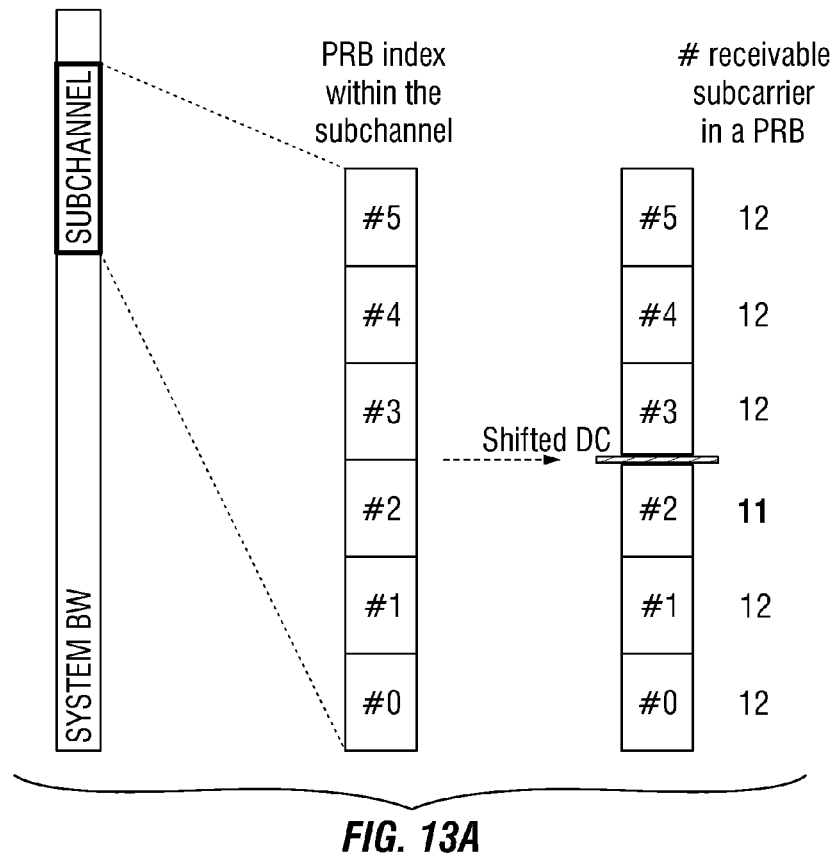
FIGS. 13(a) and (b) show an exemplary configuration with a shifted DC subcarrier in the non-centered subchannel, according to an embodiment.
Figure 13B:
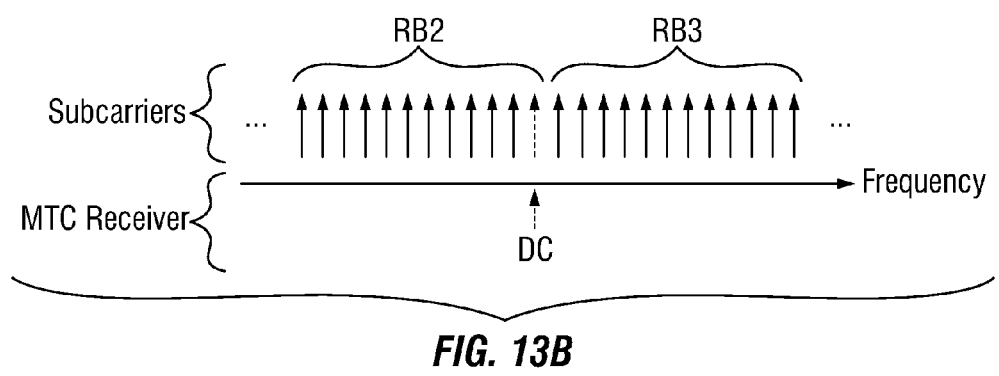

As illustrated in FIGS. 12(a) and (b) and FIGS. 13(a) and (b), due to the UE 12/50 implementation, the subcarrier corresponding to the shifted DC is not receivable by the MTC UE 50 operating in that subchannel. Thus, common signals such as CRS can still be transmitted over the shifted DC and be received by other UEs, but those common signals are not received by the MTC UE 50. Due to the removal of the shifted DC, the corresponding PRB only has 11 subcarriers that are usable for carrying either EPDCCH or PDSCH to the MTC UE 50. The REs of the shifted DC can be viewed as punctured, so that the rate matching and resource mapping procedure do not need to be changed. To compensate for the loss of the shifted DC subcarrier, mechanisms such as lower modulation and coding rate can be used by the scheduler.

Using Configuration A or Configuration B can be pre-defined or configured via RRC signaling, for example. If configurable, the eNB 10 can signal to MTC UE 50 whether it should use Configuration A or Configuration B in a static or semi-static fashion. This gives the eNB 10 flexibility in how to schedule EPDCCH/PDSCH, and what transmission mode (TM) to use for PDSCH, etc.

For simplicity of UE implementation, it may be preferred in certain systems that the configuration is pre-defined. In choosing between Configuration A and Configuration B for the MTC UE 50, the layout of reference signals in a PRB needs to be considered as the shifted DC will make all REs coincides with the shifted DC not receivable. Of course, one of ordinary skill in the art would realize that various other configurations may be implemented within the scope of the present disclosure.

Note that if the location of the shifted DC is chosen to coincide with a particular subcarrier index within a PRB, then the amount of offset in frequency domain is slightly different depending on if the subchannel is located above or below the center carrier frequency of the system BW. For example, if the shifted DC is always mapped to subcarrier #0 in a PRB, and the subchannel is j PRB above the carrier frequency of the system BW as shown in FIG. 8 and FIG. 9, then the shifted DC is at $F'_c = F_c + j*180 + 15$ (kHz). If the subchannel is j PRB below the center carrier frequency, then the shifted DC is at $F'_c = F_c - j*180$ (kHz).

Figure 14:
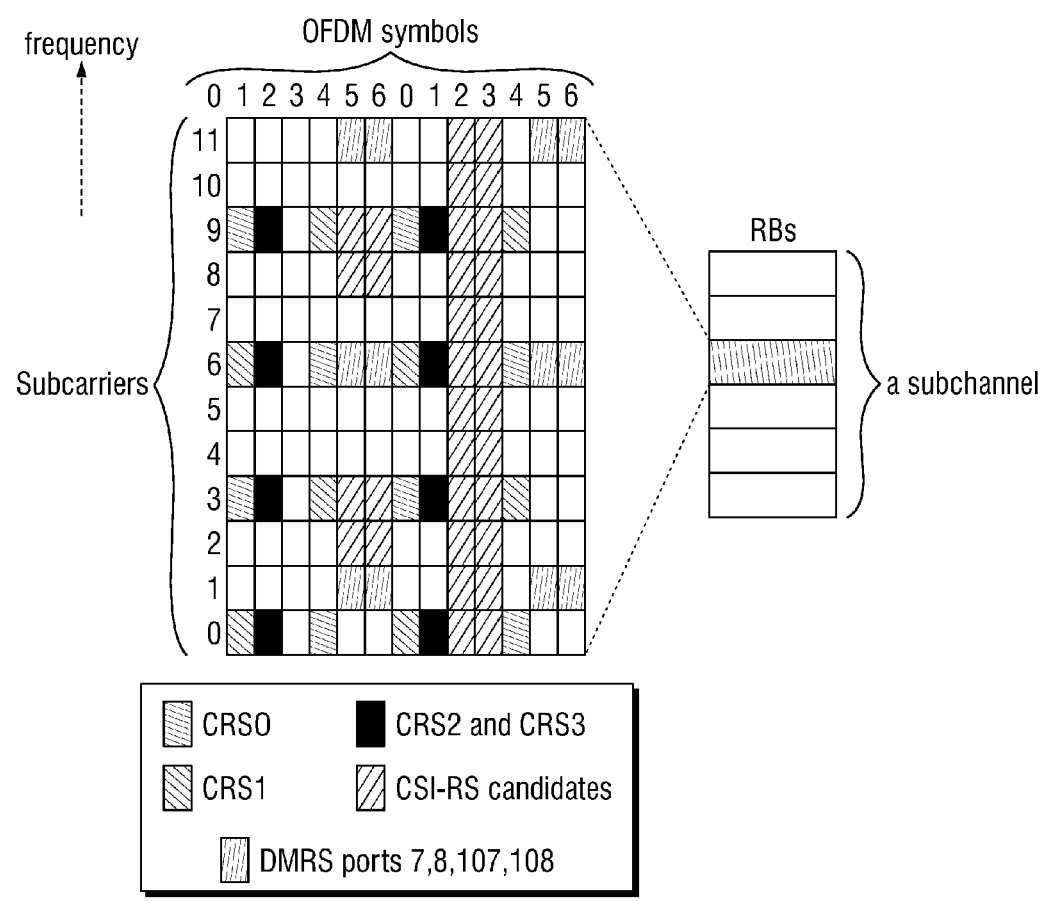
FIG. 14 is an example of reference symbols in a PRB, according to an exemplary embodiment.

As illustrated in FIG. 14, several types of reference signals may be sent by the eNB in a PRB, including but not limited to:

CRS's RE position is contingent on $v_{shift}$;

DMRS for port 5 is contingent on $v_{shift}$;

DMRS for port 7, 8, 107, 108 are fixed within a PRB;

CSI-RS ports are not fixed. Their RE position within a PRB depends on the CSI-RS configuration.

One exemplary method of shifted DC designation is to always use a same configuration for all cells and all subchannels. For normal cyclic prefix, the highest indexed subcarrier in a PRB includes REs for transmitting DMRS port 7,8,107 and 108. Thus to protect REs carrying UE-specific demodulation signal, making DC subcarrier to be the lowest-indexed subcarrier in PRB #3 in the subchannel is preferred (FIGS. 12(a) and (b), configuration A).

Alternatively, the rule of using Configuration A or Configuration B is predefined, but different configurations can be used depending on the scenario. For example, different cells may use different configurations. For example, to protect CRS reception, it can be defined that the shifted DC is implicitly linked to either Configuration A or Configuration B depending on the cell ID to avoid CRS being in the DC subcarrier. For example, CRS symbols, $r_{l,n_s}(m')$, associated with antenna port p are mapped to resource element (k,l) as follows:

$$a_{k,l}^{(p)} = r_{l,n_s}(m') \quad \text{Eq. (1)}$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

-continued $$m = 0, 1, \ldots, 2 \cdot N_{RB}^{DL} - 1$$

$$m' = m + N_{RB}^{max,DL} - N_{RB}^{DL}$$

Where $n_s(=0, 1, \ldots, 19)$ is the slot index, k and l are the subcarrier and OFDM symbol index, respectively. The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{Eq. (2)}$$

The cell-specific frequency shift is given by:

$$v_{shift} = N_{ID}^{cell} \bmod 6 \quad \text{Eq. (3)}$$

Thus if $v_{shift} = N_{ID}^{cell} \bmod 6 \in \{0,3\}$, CRS of port 0 occupy subcarrier with index k=6m, and the shifted DC uses Configuration B. If $v_{shift} = N_{ID}^{cell} \bmod 6 \in \{2, 5\}$, CRS of port 0 occupy subcarrier with index k=6m+5, and the shifted DC uses Configuration A. For other cell IDs, a default Option can be used, e.g., Configuration A.

Similar to CRS, a pre-defined cell ID dependent rule can be constructed to avoid puncturing port 5 DMRS due to the shifted DC.

In yet another alternative, the eNB 10 can schedule higher-priority channel to a PRB that does not contain the shifted DC, while a lower-priority channel can be allocated to the PRB containing the shifted PRB. For example, EPDCCH is always allocated to PRBs that do not contain the shifted DC, so that the DMRS for EPDCCH is always receivable by the MTC UE 50. It is also possible that, to avoid the punctured subcarrier, the eNB 10 never schedule any transmission in the PRB containing the shifted DC. This avoids the problems brought by the shifted DC, at the expense of reduced resource for MTC UE 50. The PRB can still be scheduled to other non-MTC UEs 12.

Figure 15:
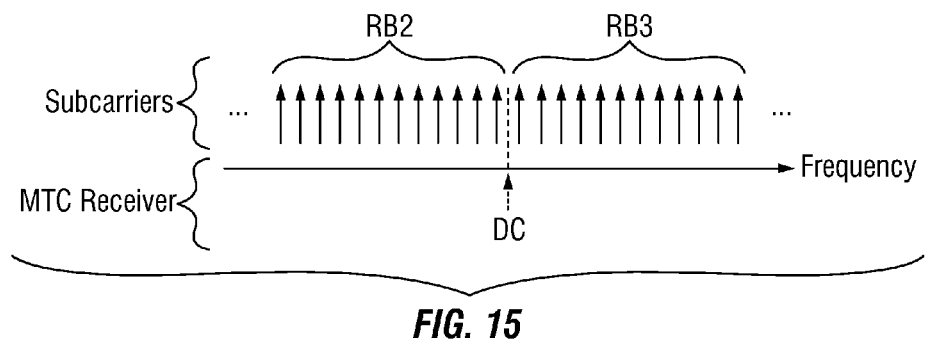
FIG. 15 shows an exemplary center frequency of a MTC subchannel between the two edge subcarriers of the center two RBs of the MTC subchannel, according to an embodiment.
Figure 16:
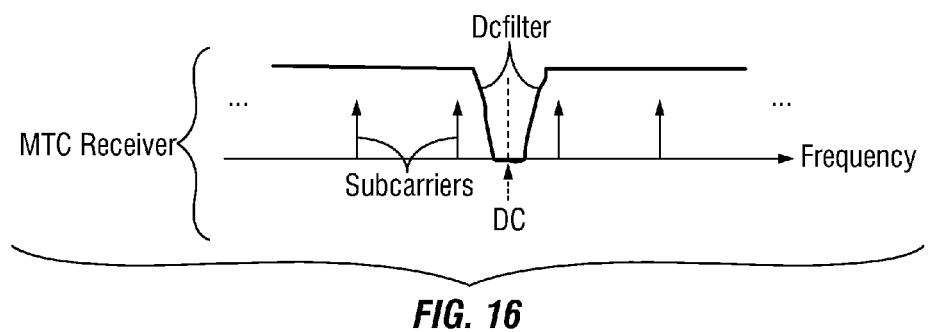
FIG. 16 is an example of DC filtering at a MTC UE receiver, according to an embodiment.

In certain of the foregoing embodiments, it is assumed that the MTC UE 50 tunes its receiving carrier frequency to an existing subcarrier of an off-the-center subchannel. While this is simple for UE 50 implementation in terms of frequency tuning step size and in dealing with DC offsets, an alternative is to build the UE 50 such that it can tune to a frequency that is at the boundary of two adjacent subcarriers. An example is shown in FIG. 15. This would allow the full PRB resources to be used for data scheduling to a MTC UEs. There is no eNB 10 scheduling restriction at the eNB 10. The drawback is that the two subcarriers adjacent to the DC could be attenuated by the DC filter at the MTC receiver. In other words, a tighter (narrower) DC filter may be required at the MTC receiver. A DC filtering example is shown in FIG. 16.

In addition, a frequency shift of half subcarrier spacing is needed during FFT processing at the MTC UE 50 receiver when it is tuned to off-center subchannels.

In this case, FFT processing at the MTC UE 50 is different depending on if the UE is receiving subchannel 0 or other subchannels. More specifically, the receiver performs the following FFT processing:

$$X(m) = \begin{cases} \sum_{n=0}^{N-1} x(n) \exp\left(-j\frac{2\pi nm}{N}\right) & \text{for subchannel 0;} \\ \sum_{n=0}^{N-1} x(n) \exp\left(-j\frac{2\pi nm}{N} - j\frac{\pi n}{N}\right) & \text{for other subchannels.} \end{cases} \quad \text{Eq. (4)}$$

Where X(m) (m=0, 1, 2, ..., N−1) is the FFT output, N(=128 for normal CP) is the FFT size, x(n) (n=0, 1, 2, ..., N−1) is the time domain sample and input to the FFT.

Let $\{y(k), k=0, 1, \ldots, 6N_{SC}^{RB}-1\}$ be the received subcarrier symbols at an OFDM symbol of the 6 RBs in a MTC subchannel other than subchannel 0, then $$y(k) = \begin{cases} X(N - 3N_{SC}^{RB} + k) & \text{for } 0 \leq k \leq 3N_{SC}^{RB} - 1; \\ X(k - 3N_{SC}^{RB}) & \text{for } 3N_{SC}^{RB} \leq k \leq 6N_{SC}^{RB} - 1. \end{cases} \quad \text{Eq. (5)}$$

That is, for subchannels other than subchannel 0, the frequency domain symbol in the middle is not skipped. For subchannel 0, the frequency domain symbol in the middle (corresponding to DC of system BW) is intentionally skipped, and the receiver operates as in the existing implementation.

100 KHz Raster

Currently the UE 12/50 is only required to perform cell search over a 100 KHz raster, according to certain embodiments. This means that the carrier center frequency must be an integer multiple of 100 kHz in all bands. If the MTC UE 50 implementation is not designed to be able to tune to other frequencies, then this will limit the location of the subchannels. Specifically, the subchannels can only be centered at carrier frequencies that are multiples of 5 PRBs away from the carrier frequency of the system $F_c$. That is, the valid subchannel center carrier frequencies are: $F'_c = F_c +/- n \times 900$ KHz, where n is an integer.

Additionally, with n×900 kHz frequency offset from the carrier frequency the MTC DC subcarrier is not always mapped to the same subcarrier within a PRB.

For system BW 10 MHz and 20 MHz: for the subchannels with $F'_c > F_c$, Configuration B of FIGS. 13(a) and (b) is used; for $F'_c < F_c$, Configuration A of FIGS. 12(a) and (b) is used. Thus depending on which side of the system bandwidth the MTC UE 50 is tuned to, both eNB 10 and the UE 50 needs to be aware of the different DC tone mappings.

Figure 17:
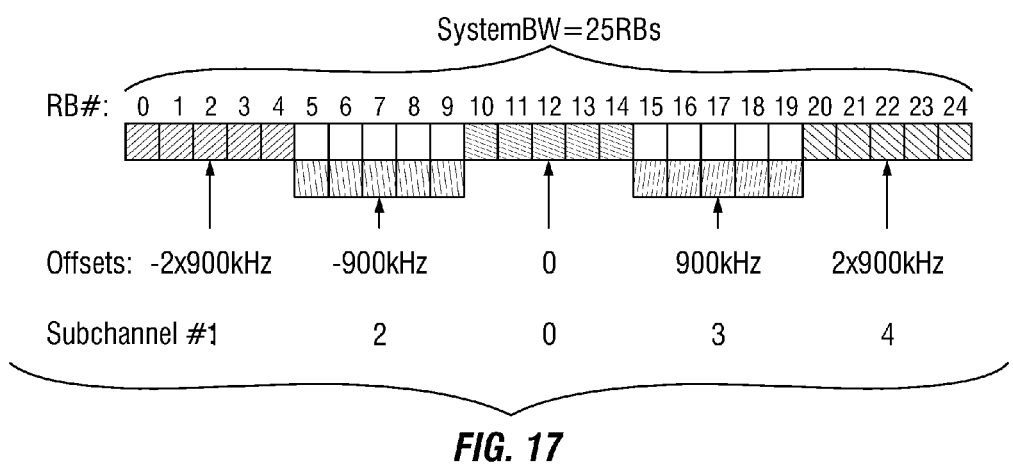
FIG. 17 is an example of MTC subchannel allocation with n×900 kHz frequency offsets in a 5 MHz system, according to an embodiment.

For system BW 3 MHz, 5 MHz, and 15 MHz: the shifted center carrier frequency will be located in the middle of a PRB. An example is shown in FIG. 17 for a 5 MHz system. Depending on whether $F'_c > F_c$ or $F'_c < F_c$, different subcarrier within the PRB will be mapped to the DC of a MTC receiver and thus is punctured at the eNB. When $F'_c > F_c$, subcarrier 5 of the center RB will be punctured, while when $F'_c < F_c$, subcarrier 6 of the center RB will be punctured. The subcarrier index in a PRB is shown in FIG. 14.

While this will allow subchannels to have 6 whole PRBs that are allocable in systems with BW 10 MHz and 20 MHz, systems with BW of {3 MHz, 5 MHz, 15 MHz} may only have 5 whole PRBs that are allocable.

UL Resource Allocation for Rel-13 MTC UEs 50

For the UL, the Rel-13 MTC UE 50 is only designed to transmit with 1.4 MHz bandwidth, according to the present example—the same as DL. Thus there is also a need to define UL subchannels, similar to DL subchannels.

Figure 18:
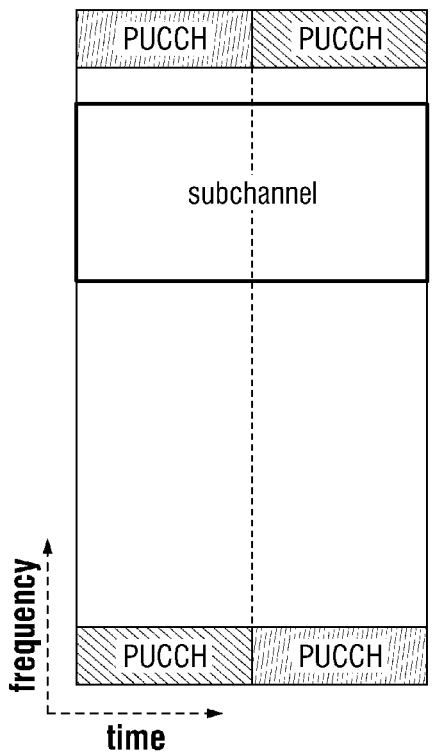
FIG. 18 is an example where UL subchannels for MTC UE do not overlap with PRBs for PUCCH of other UEs, according to an embodiment.

In defining the UL subchannel, it is to be ensured that the MTC UE 50 UL transmission does not overlap with other legacy UE's 12 UL transmission especially the PUCCH at the edge of the UL BW. The reason is that in LTE, a PUCCH is transmitted on two PRBs, one at the top of the frequency band in one slot and the other at the bottom of the frequency band in the other slot of the same subframe. In order to multiplex with legacy UEs' 12 PUCCH, a MTC UE 50 needs to switch frequency between the two slots. This cannot be done as it requires a guard time period (except when the system BW is 1.4 MHz also). There may be two exemplary options:

The UL subchannel is never defined to overlap with the PRBs that can be potentially used for PUCCH transmission by legacy UEs 12. A simple solution is that the UL subchannels are never defined to use the top m and bottom m PRBs, where m is a sufficiently large integer. This is illustrated in FIG. 18.

Figure 19:
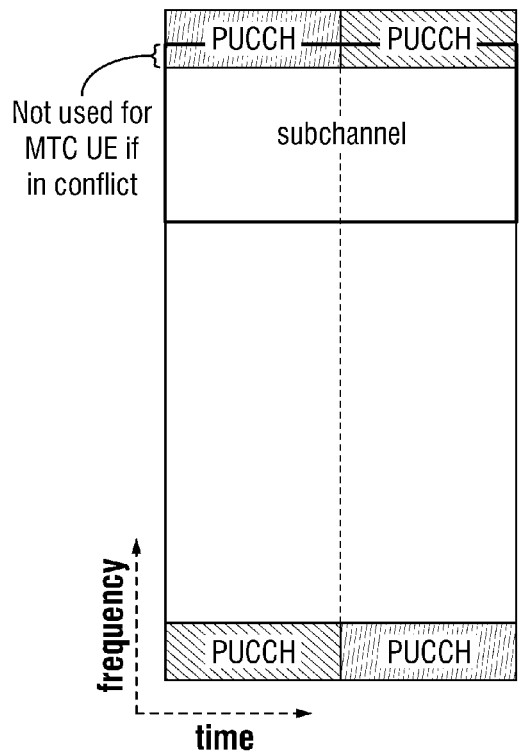
FIG. 19 is an example where UL subchannels for MTC UE may overlap with PRBs for PUCCH of other UEs, according to an embodiment.

Another alternative is that the subchannel can be defined to overlap with the PRBs that are potentially used for PUCCH transmission of legacy UEs 12. But PUCCH transmissions of legacy UEs 12 are protected via eNB 10 scheduling decision. This is illustrated in FIG. 19.

The eNB 10 schedules MTC UE 50 PUSCH such that it does not overlap with PRBs that are used for PUCCH of other UEs 12 in the same subframe.

For MTC UE 50 PUCCH, it can be pre-defined such that the PRBs for MTC UE 50 PUCCH never overlap with PRBs for PUCCH of other UEs 12. For example, the MTC UE 50 PUCCH never uses the band edge PRB(s).

FDD

For FDD UL, the subchannels can be any consecutive 6 PRBs. The UL subchannels may be defined with or without implicit relationship between UL and DL subchannels. Even for half-duplex FDD, the UL subchannel can be uncorrelated with the DL subchannel as a large guard time is needed anyway for switching between DL and UL. The guard time can be defined to provide enough time for tuning to a frequency that is different from the previous subframe.

Compared to DL, UL can have various differences, including the following:

Unlike in the DL, the MTC UE 50 does not have to tune to the central 72 subcarriers of the system even during initial access.

There is no DC subcarrier issue on the UL and thus scheduling over the full 6 RBs in the 1.4 MHz MTC bandwidth is always possible If the 100 KHz raster is also followed in the UL, then the center carrier frequency for the UL subchannel also has to be located at carrier frequencies that are multiples of 900 kHz (or 5 PRBs) away from the carrier frequency $F_c$ of the system. In that case, the whole PRBs available for UL scheduling are also constrained to 5 PRBs for systems with BW of {3, 5, 15} MHz.

TDD

For TDD, it may be desirable that the UL subchannel is the same as the DL subchannel at any time. This could save switching time for UL-to-DL switch and DL-to-UL switch and thus there is no need to introduce additional guard time for MTC UEs 50.

On the other hand, for full flexibility, a MTC UL subchannel may be allocated to a different frequency from the DL subchannel. In this case, additional guard time is needed to allow a MTC UE 50 to switch between DL and UL. This can be done through redefining timing of DL and UL scheduling and HARQ, e.g. the delay from receiving a UL grant to UL transmission or the delay from receiving a DL data to sending an Ack/Nack in the UL.

Figure 20:
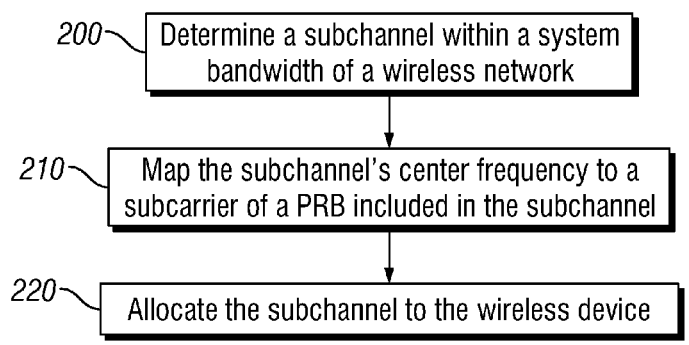
FIG. 20 is an exemplary flowchart illustrating a method of operating a wireless device in a wireless network, according to an embodiment.

FIG. 20 is an exemplary flowchart illustrating a method of operating a wireless device in a wireless network. Referring now to FIG. 20, at operation 200, the wireless network node 10 is configured to determine a subchannel within a system bandwidth of the wireless network, using processing module 40. According to an embodiment, the subchannel can be an off-center subchannel with respect to the system bandwidth, and the subchannel can include a plurality of consecutive subcarriers taken from one or more contiguous PRBs. From operation 200, the process moves to operation 210, where the processing module 40 of wireless network node 10 can further map the subchannel's center frequency to a subcarrier of a PRB included in the subchannel. According to various embodiments, the center frequency can correspond to a DC subcarrier at a receiver (e.g., transceiver module 32 of associated with the wireless device (e.g., MTC UE 50). From operation 210, the process moves to operation 220, where the wireless network node 10 can then allocate the subchannel to the MTC UE 50. As described herein, the subchannel allocation can be via RRC signaling, or via physical layer indication. Of course, one of ordinary skill in the art would realize that various other types of indication may be employed within the scope of the present disclosure.

According to certain embodiments, a physical channel can be scheduled to one or more subcarriers of the subchannel, where the one or more subcarriers do not include the DC subcarrier. As an alternative, a physical channel can be scheduled to one or more subcarriers of the subchannel, where the one or more subcarriers include the DC subcarrier, and rate matching can be performed on the physical channel bits to account for the DC subcarrier.

As a result of the foregoing methods and systems, a UE can be allowed to transmit and receive with a reduced RF bandwidth, in an LTE system with a wider system bandwidth.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

3GPP 3rd Generation Partnership Project
ARQ Automatic Repeat Request
BTS base transceiver station
BW Bandwidth
CRS Cell-specific reference signal
CSI-RS Channel State Information RS
CFI Control format indicator
DC Direct Current
DL Downlink
DMRS Demodulation reference signal
eNB Enhanced Node-B
ePDCCH Enhance physical downlink control channel
FDD Frequency Division Duplexing
FFT Fast Fourier Transform
HARQ Hybrid ARQ
LTE Long term evolution
MCS Modulation and Coding Scheme
MME Mobile Management Entity
MTC Machine Type Communication
PBCH Physical broadcast channel
PDSCH Physical downlink share channel
PDCCH Physical downlink control channel
PRB Physical Resource Block
PSS Primary synchronization signal
PUCCH Physical Uplink Control Channel
PUSCH Physical Uplink Shared Channel
RB Resource Block
RNTI Radio Network Temporary Identifier
SSS Secondary synchronization signal
SCID Scrambling identity
TDD Time Division Duplexing
TM Transmission mode UE User Equipment
UL Uplink
VRB Virtual Resource Block

What is claimed is:

1. A method of operating a wireless device in a wireless network, comprising:
   determining a subchannel within a system bandwidth of the wireless network, wherein
      the subchannel is an off-center subchannel with respect to the system bandwidth, and
      the subchannel includes a plurality of consecutive subcarriers taken from a plurality of contiguous physical resource blocks (PRBs);
   mapping the subchannel's center frequency to a subcarrier of a PRB included in the subchannel, wherein the center frequency corresponds to a direct current (DC) subcarrier at a receiver associated with the wireless device; and
   allocating, by a wireless network node, the subchannel to the wireless device, wherein
      the mapping is predefined and is a function of an identifier of the wireless network node, and
      the wireless network node schedules a lower priority channel to the PRB including the subcarrier to which the subchannel's center frequency is mapped, as compared to a channel scheduled to a PRB that does not include the shifted DC subcarrier.

2. The method of claim 1, wherein the allocating comprises signaling to the wireless device using radio resource control (RRC) signaling.

3. The method of claim 1, wherein the allocating comprises signaling to the wireless device via physical layer indication.

4. The method of claim 1, wherein the subcarrier, to which the subchannel's center frequency is mapped, is the lowest frequency subcarrier of the PRB.

5. The method of claim 1, wherein the subcarrier, to which the subchannel's center frequency is mapped, is the highest frequency subcarrier of the PRB.

6. The method of claim 1, further comprising:
   scheduling a physical channel to one or more subcarriers of the subchannel, where the one or more subcarriers do not include the DC subcarrier.

7. The method of claim 1, further comprising:
   scheduling a physical channel to one or more subcarriers of the subchannel, where the one or more subcarriers include the DC subcarrier; and
   performing rate matching on one or more physical channel bits to account for the DC subcarrier.

8. A non-transitory computer-readable medium storing instructions thereon for, when executed by a processor, performing a method of allocating resources for a wireless device with a reduced radio frequency (RF) bandwidth, the method comprising:
   determining a subchannel within a system bandwidth of a wireless network, wherein
      the subchannel is an off-center subchannel with respect to the system bandwidth, and
      the subchannel includes a plurality of consecutive subcarriers taken from a plurality of contiguous physical resource blocks (PRBs);
   mapping the subchannel's center frequency to a subcarrier of a PRB included in the subchannel, wherein the center frequency corresponds to a direct current (DC) subcarrier at a receiver associated with the wireless device; and
   allocating, by a wireless network node, the subchannel to the wireless device, wherein
      the mapping is predefined and is a function of an identifier of the wireless network node, and
      the wireless network node schedules a lower priority channel to the PRB including the subcarrier to which the subchannel's center frequency is mapped, as compared to a channel scheduled to a PRB that does not include the shifted DC subcarrier.

9. A user equipment (UE) with a reduced radio frequency (RF) bandwidth in a wireless network, comprising:
   a receiver receiving an allocated subchannel, from a wireless network node, within a system bandwidth of the wireless network, wherein
      the subchannel is an off-center subchannel with respect to the system bandwidth,
      the subchannel includes a plurality of consecutive subcarriers taken from a plurality of contiguous physical resource blocks (PRBs),
      the subchannel's center frequency is mapped to a subcarrier of a PRB included in the subchannel, wherein the center frequency corresponds to a direct current (DC) subcarrier associated with the UE,
      the mapping is predefined and is a function of an identifier of the wireless network node, and
      a lower priority channel is scheduled to the PRB including the subcarrier to which the subchannel's center frequency is mapped, as compared to a channel scheduled to a PRB that does not include the shifted DC subcarrier.

10. The UE of claim 9, wherein the allocated subchannel is identified via radio resource control (RRC) signaling.

11. The UE of claim 9, wherein the allocated subchannel is identified via physical layer indication.

12. The UE of claim 9, wherein the subcarrier, to which the subchannel's center frequency is mapped, is the lowest frequency subcarrier of the PRB.

13. The UE of claim 9, wherein the subcarrier, to which the subchannel's center frequency is mapped, is the highest frequency subcarrier of the PRB.

14. The UE of claim 9, wherein
   a physical channel is scheduled to one or more subcarriers of the subchannel, where the one or more subcarriers include the DC subcarrier, and
   rate matching is performed on one or more physical channel bits to account for the DC subcarrier.

* * * * *